Oct. 6, 1942.   E. R. PERSON   2,298,156
MANUFACTURE OF BRUSHES
Filed Dec. 13, 1940   3 Sheets-Sheet 1
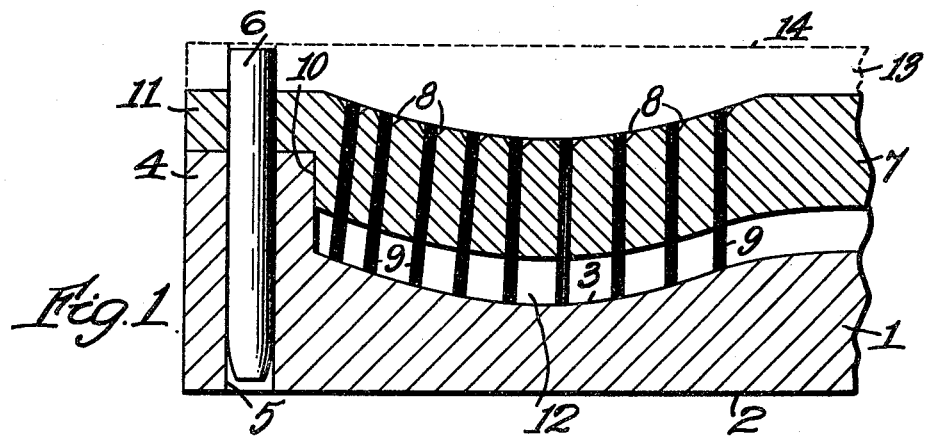
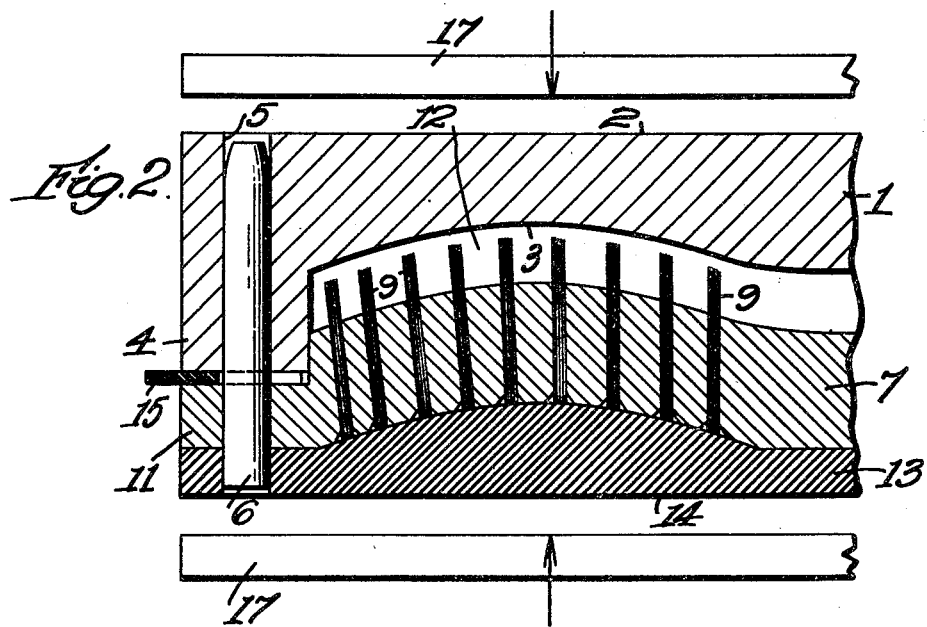
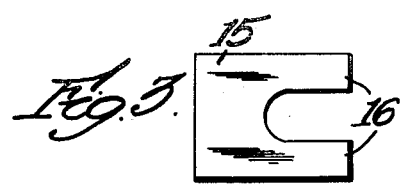
Inventor
Earl R. Person Oct. 6, 1942.  E. R. PERSON  2,298,156
MANUFACTURE OF BRUSHES
Filed Dec. 13, 1940  3 Sheets-Sheet 2
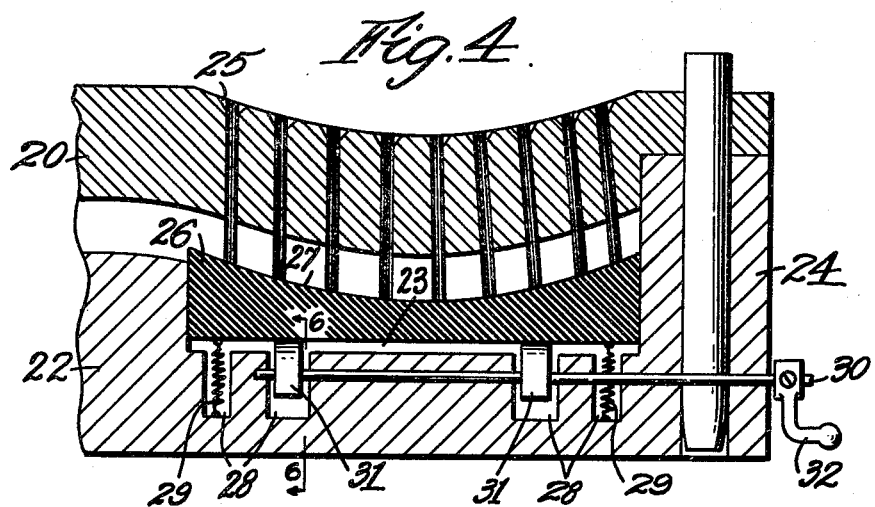
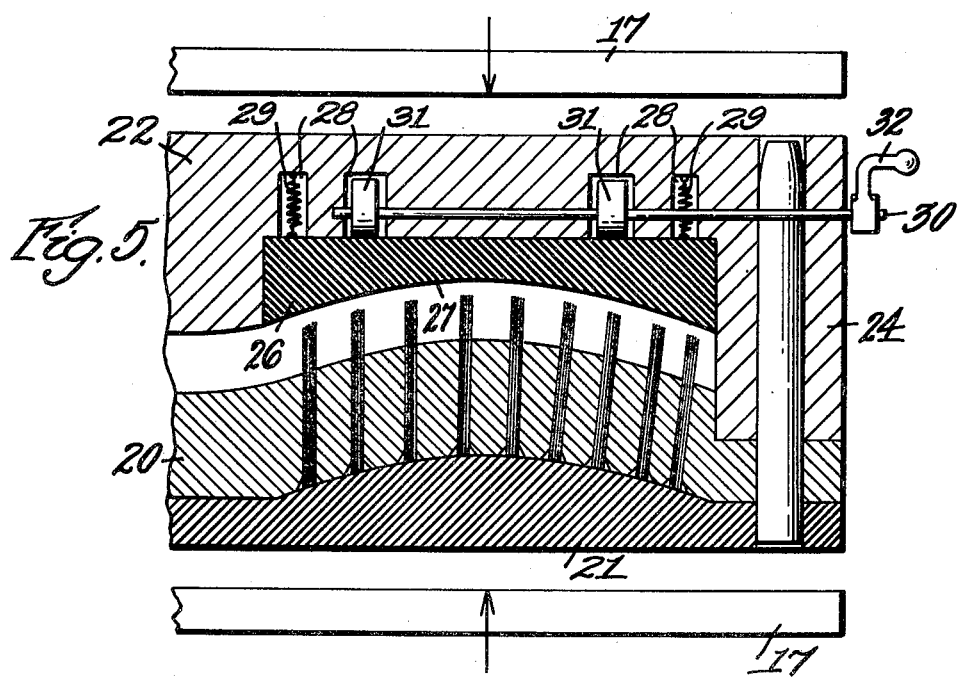
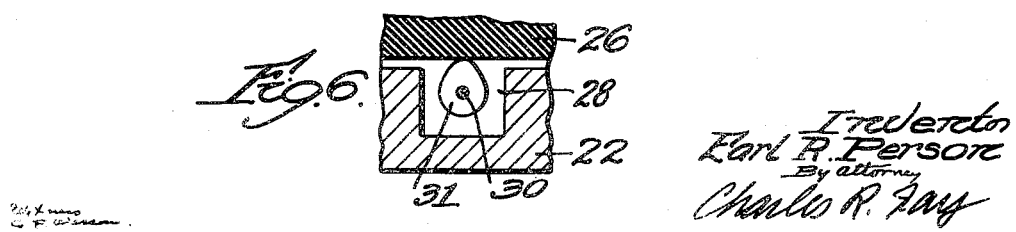

Oct. 6, 1942.   E. R. PERSON   2,298,156
MANUFACTURE OF BRUSHES
Filed Dec. 13, 1940   3 Sheets-Sheet 3
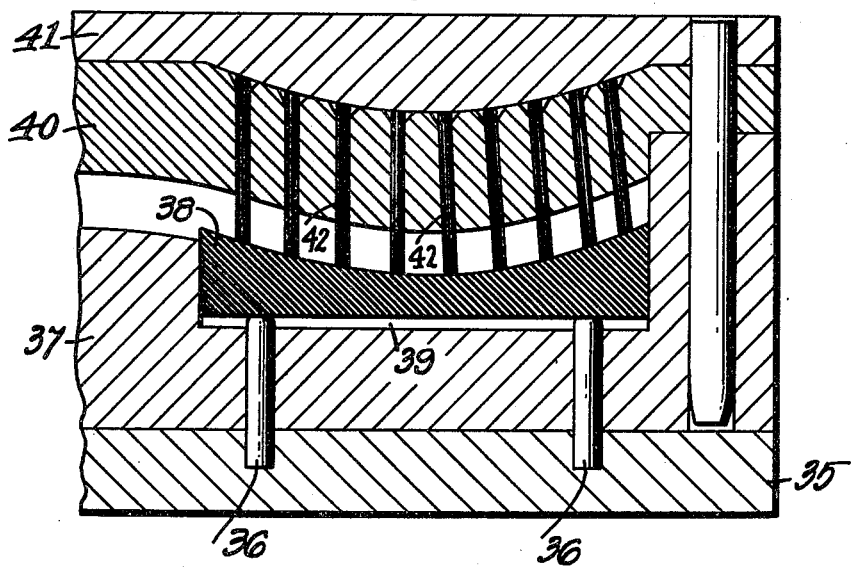
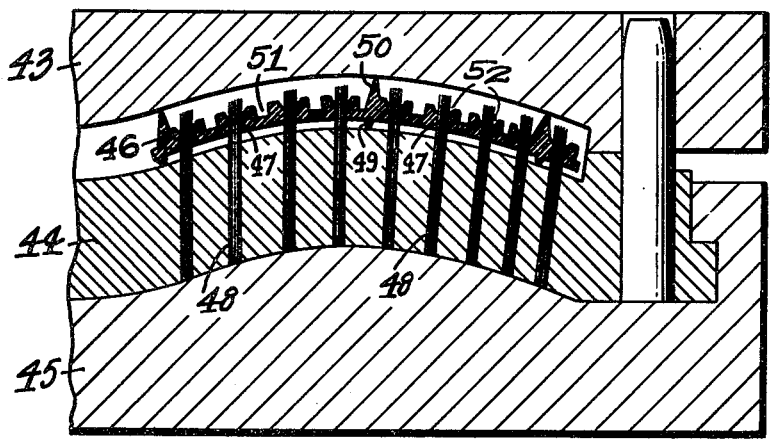

Patented Oct. 6, 1942

2,298,156

UNITED STATES PATENT OFFICE 2,298,156

MANUFACTURE OF BRUSHES

Earl R. Person, Leominster, Mass., assignor to E. I. du Pont de Nemours & Company, Wilmington, Del., a corporation of Delaware Application December 13, 1940, Serial No. 370,029

19 Claims. (Cl. 18—36)

This invention relates to the manufacture of brushes and similar articles by injection molding, wherein a die is provided into which bristles extend, and a thermoplastic material is injected into the die under conditions of heat and pressure so that the bristles are sealed into the brush.

Objects of the invention include the provision of dies for holding the bristles so the bristle ends evenly extend part way into the die cavity in position for being sealed by the plastic injected into the die; the provision of a method for the injection molding of brushes; and the provision of limiting means used in conjunction with the die to pre-set the bristles at the desired extension into the die cavity and hence in the finished brush back, such setting being done by limiting the ends of the bristles which are to be set in the blank.

Other objects and advantages of the invention will appear hereinafter.

Reference is to be had to the accompanying drawings, in which

Fig. 1 is a sectional view thru a die embodying the present invention, and showing the bristles in pre-set or limited condition;

Fig. 2 is a sectional view of the die of Fig. 1, but showing it inverted and ready for the injection molding step;

Fig. 3 is a plan view of the die spacer;

Fig. 4 is a sectional view similar to Fig. 1, but showing a modified die;

Fig. 5 is a sectional view similar to Fig. 2, but showing the modified die of Fig. 4;

Fig. 6 is a sectional view on line 6—6 of Fig. 4;

Fig. 7 is a sectional view thru a die showing a modification; and

Fig. 8 is a sectional view thru a die showing an insert.

Fig. 1 shows a die part 1 having a plane surface 2 and a surface 3 shaped to the desired form of the brush back. Surface 3 may be of any conformation without affecting the present invention. A raised boss 4 is provided integral with die part 1, and this boss is bored at 5 to receive an aligning dowel pin 6. Of course, the die parts extend beyond the broken lines to accommodate the brush handle, which forms no part of the present invention and hence need not be disclosed.

A second die part 7 is provided and this die part is perforated as at 8 in a desired tuft pattern so as to admit and hold a plurality of tufts 9. Die part 7 is provided with a recess 10 complementary to the boss 4 and these elements cooperate to form a guideway for relative movement of the die parts. Dowel pin 6 extends thru a bore in a reduced member 11 formed by the recess 10, so that the combination of the pin and guideway will ensure against any transverse or angular relative movement of the die parts, limiting the same to a precise vertical movement as seen in Figs. 1 and 2.

Die part 7 is shaped on both sides to conform to the surface 3, whatever this surface may be, and it will be seen that all three surfaces are parallel. With the parts arranged as in Fig. 1, the bristle tufts 9 are placed in the perforations 8 by any convenient means and the inner ends of the tufts come to rest against the surface 3, thus being exactly limited in uniform extent by this surface.

Recess 10 is not as deep as boss 4, so that a die cavity 12 results when the die parts are assembled as in Fig. 1 This cavity is of course formed by surface 3, the lower surface of die part 7, and a part of the inner wall of boss 4.

After the bristles have been located in perforations 8, a backing plate 13 having a plane surface 14 is set on the die part 7. This backing plate must have another surface to correspond to the upper surface of part 7, as shown in Fig. 1, and the plate is also bored to receive the dowel pin to correctly position it on part 7. Plate 13 acts as a support for the bristles when the entire assembly of Fig. 1 is inverted to assume the position shown in Fig. 2.

When the parts are in inverted position, die part I is raised slightly and a filler or spacing plate 15 is thrust into the space thus created between boss 4 and reduced member 11, and die part I is then dropped to rest thereon. Plate 15 may assume any shape necessary to support the part I, but in the present instance it is shown as a thin parallel sided U-shaped element having legs 16 forming a recess for reception of the dowel pin.

It will be clear that the length of the guideway between recess 10 and boss 4 prevents a separation of the die parts when part I is in raised position, and therefore no fins will appear on the brush when removed from the die. The parting line due to the separate dies will be exactly the same whether the brush were molded with the parts as in Fig. 2 or Fig. 1. Also, with the spacer 15 in place, die part I is held in raised position during molding; and hence a space is produced between the surface 3 and the ends of the bristles to be embedded or set in the brush. This space prevents the bristles from the possibility of extending too far towards the back of the brush and thus rendering the finished product defective, unsightly and non-uniform.

During the injection of the plastic material into the die cavity under great pressure, press plates or beds 17 are provided to approach and clamp the die part 1 and backing plate 13 on their plane surfaces 2 and 14, as represented by the arrows in Fig. 2. These pressing elements prevent separation of the parts of the die under the pressure of the injection and ensure that uniform brushes and handles are produced at each operation.

Figs. 4 to 6 illustrate a modified die apparatus comprising a perforated die part 20 similar in all respects to die part 7. Also the backing plate 21 corresponds to plate 13 and is used for the same purpose.

However, die part 22 is formed with a recess 23, this recess extending from boss 24 to a point beyond the last bristle perforation 25. A separate die element 26 is made to slidingly fit in the recess 23, and it is provided with a surface 27 to form the brush back during the molding operation and to limit the bristle extent as shown in Fig. 4. In this case, the separable die element 26 is extended from recess 23 the exact distance required for the depth of the brush back from the ends of the bristles to the brush surface. When the assembly is inverted and set in the press, the separable die is retracted into its recess, and the die surface 27 merges smoothly into the molding surface of the die part 22 to form the handle of the brush.

The means for extending and retracting the die and limiting element 26 may be of any desired or convenient construction. In the embodiment shown, this means comprises a plurality of slots 28 in die part 22. In some of these slots there are arranged tension springs 29 which always exert a force tending to retract the element 26. A shaft 30 extends thru others of the slots 28 and eccentrics 31 are secured to the shaft in position to force the element 26 outwardly to its fullest extent when the hand crank 32 is correctly actuated.

In Fig. 7 there is shown a further modification of the present invention, in which a shaker bed 35, on which the die is placed for the bristle shaking operation, is provided with fixed pins 36. Die part 37 has a movable die element 38 in recess 39, and bores corresponding to pins 36 extend from the recess to the flat surface of the part 37. Thus with perforated die part 40, but not backing plate 41 in place, the bristles may be shaken into the perforations 42, and when the die as a whole is removed from the shaker bed, the element 38 will fall of its own weight into position in the recess, or the pressure of the injected plastic will force it to, as the plastic will transmit its pressure equally within the die cavity. In this case, the bristles must be tightly packed in the perforations so that they will not fall out when the element 38 recedes, and plate 41 must be used to provide for the die plates and to prevent the bristles from being backed out under pressure.

Fig. 8 discloses a die solid part 43, and a perforated part 44, with a further plate 45. The part 45 may be integral with part 44 in this case, if desired. To shake the bristles, part 43 is removed, and insert 46 is placed as shown with apertures 47 aligned with perforations 48. Feet 49 space the insert from die part 44, and projections 50 extend upwards. Depressions 51 are utilized to form locks for the plastic material, and each aperture 47 has a countersunk portion 52 to allow the shaking medicine to insert the bristles. Naturally, if the countersinks were not present, the bristles would bounce off the sharp projections formed by the apertures, and very few bristles would ever enter. The countersinks, however, form funnels for the bristles to easily enter and become packed in the apertures and perforations 48.

In this case, the insert provides a stiffener for the inner ends of the bristles to resist bending and dislodgement under the extreme pressure of the injection operation, and they also provide means for entering the bristles into the perforated die part so that this operation can be accomplished from the cavity side of the die and need not be done from the outside of the die as is necessary in the dies of Figs. 1, 4, and 5. Incidentally, the countersinks 52 cannot be applied to the cavity ends of the perforations in die parts 7, 20, 40, or 44, as this would leave objectionable humps around each tuft of bristles in the finished brush, whereas the countersinks in the insert are of course in the interior of the finished article and cannot be seen. In any case, after the bristles are shaken in the perforations, the part 43 is replaced, and the injection may then take place without the necessity of inverting the die.

It will be seen from the above that this invention provides a die for the injection molding of brushes in which the bristles are located by their ends which are to be embedded in the brush material, and that the limiting means also forms a die surface. The spacer 15 and eccentrics 31 will locate their respective dies 3 and 26 in correct spaced relation to the bristle ends and provide means for adjusting the depth of the molding cavity 12. The backing plate 21 prevents the bristles from falling from the perforations 8, 25 and also tends to mat down any extending bristle ends. Of course, these ends must later be trimmed or cut to desired shape, so that breaking or matting these ends, when present, is of no ill effect to the process of manufacture or to the finished articles.

Having thus described my invention and the advantages thereof, I do not wish to be limited to the details herein disclosed, otherwise than as set forth in the claims, but what I claim is:

1. The method of making a brush which comprises placing bristles in a die with their ends extending thru a die molding cavity therein to contact a limiting surface thereof, deepening said cavity so that said bristle ends stop short of said surface, and causing a plastic to be flowed into said cavity.

2. The method of making a brush which comprises providing a die assembly having two relatively movable surfaces forming a molding cavity, placing bristles in said die so that their ends extend thru said cavity and impinge on one of said surfaces, moving said one surface so that said ends are spaced therefrom, and flowing a plastic material into said cavity.

3. The method of making a brush which comprises providing a die having at least two relatively movable parts forming an adjustable molding cavity, placing bristles in one part and relatively adjusting said parts so that said bristles are limited in their extent therein by the other part, and again adjusting said parts so that said bristle ends extend only part way thru said cavity.

4. The method of making a brush which comprises placing bristles in a die having an enclosed adjustable molding cavity, extending said bristles so as to cause corresponding ends thereof to contact a surface of said cavity, adjusting said surface to render the cavity deeper, so that said bristle ends are spaced from said surface, and causing a plastic material to be flowed around said ends, and trimming the opposite ends.

5. The method of making a brush which comprises placing bristles in a die having a closed molding cavity in such a manner as to cause said bristles to contact and be limited in their extent by a surface of said cavity, enlarging said cavity in the direction of the extending bristles so that said bristles fail to contact said surface, flowing a plastic material into said cavity, and utilizing said surface as a molding surface for the cavity.

6. In an apparatus of the class described, a die having a cavity for the reception of plastic material, means adapted for the holding of bristles so that ends thereof extend into said cavity, means in said die against which ends of said bristles impinge, and means effective to provide for adjusting said bristle impinging means in a direction longitudinally of said bristles into a non-impinging relation therewith.

7. In an apparatus for injection molding, a die having a cavity of generally shallow depth and having means forming opposite surfaces therein, means to hold bristles so that their ends extend into said cavity and contact one of said surfaces to limit the extent of said ends, and means for adjusting at least one of said surface-forming means to relatively retract said surfaces whereby said bristle ends may stop short of said one surface for the molding operation.

8. In an apparatus for injection molding of brushes, a die comprising a plurality of parts, means forming a molding cavity between said parts, one of said die parts having means to hold bristles so that the ends thereof, which are to be embedded, contact and are limited by another die part, and means for relatively adjusting said parts from each other to deepen said cavity whereby said ends stop short of said other part.

9. In an apparatus of the class described, a die for molding brushes comprising a plurality of separable die parts, means forming a molding cavity between said parts, means effective selectively to locate said parts in relatively close or more greatly spaced conditions, and perforations thru one die part for the passage therethru of bristles in position to be stopped by the other die part in said relatively closely spaced condition.

10. In an apparatus of the class described, a die for molding brushes comprising a plurality of parts, each part having a molding surface, means adapted to locate said surfaces in relatively close position, means effective to hold said surfaces in more greatly spaced relation, and perforations thru one part for the passage of bristles therethru in position to be stopped by the surface of the other die part in said relatively close position of said surfaces.

11. In an apparatus of the class described, a die for molding brushes comprising a plurality of parts each having a molding surface, said parts being movable to and from each other, means limiting the movement of said parts toward each other, means effective to locate said parts in relatively greater spaced condition, and perforations thru one part for the passage of bristles therethru in position to be stopped by the surface of the other die part in said relatively close position of said surfaces.

12. In an apparatus of the class described, a die for molding brushes comprising a plurality of die parts forming a cavity therebetween, said die parts being movable to increase or decrease the depth of said cavity, and a spacer adapted to be inserted between portions of said die parts to locate them in their position of increased cavity depth.

13. In an apparatus of the class described, a die for molding brushes comprising a plurality of die parts, a molding cavity between said parts, means for moving said parts to and from each other to vary the depth of said cavity, an extending boss on one die part and a corresponding recess on another die part, said boss and recess acting as a guide for the movement of said die parts, and perforations thru one die part for the passage therethru of bristles in position to be stopped by the other die part in said relatively closely spaced condition.

14. An apparatus as recited in claim 13 in which said boss has a surface slidable on a wall of said recess, said surface forming a wall of the molding cavity.

15. In an apparatus of the class described, a die comprising a pair of cooperating parts, one part having a relatively fixed molding surface, the other part having a movable molding surface, means to move said surface to and from said one part to vary the distance between surfaces, and said one part having bristle admitting apertures located at an angle to said movable molding surface.

16. In an apparatus of the class described, the combination of a die part having an interior recess, a die element movable in said recess, and a perforated die part cooperating therewith; with a shaker bed, and means on said bed effective to move said element to bristle-limiting position for the shaking operation.

17. An apparatus as recited in claim 16 in which said means comprises a pin fixed to said bed, said pin being adapted to project thru said first named die part into said recess.

18. The method of making a brush which comprises placing bristles in a die with their ends extending thru a die cavity therein to contact a limiting surface, relatively moving said surface a distance from said ends to enlarge the cavity thus providing a space for material between said surface and the bristle ends, and flowing a plastic material into said enlarged cavity.

19. The method of making a brush which comprises placing bristles in a die with their ends extending thru a die cavity therein to contact a limiting surface, deepening said cavity so that said bristle ends stop short of said surface, flowing a plastic material into said cavity, and utilizing said surface as a molding surface to form the rear face of the brush.

EARL R. PERSON.

CERTIFICATE OF CORRECTION.

Patent No. 2,298,156. October 6, 1942.

EARL R. PERSON.

It is hereby certified that error appears in the printed specification of the above numbered patent requiring correction as follows: Page 2, first column, line 74, for "medicine" read --machine--; page 3, first column, line 3, claim 4, strike out the comma and words ", and trimming the opposite ends"; and that the said Letters Patent should be read with this correction therein that the same may conform to the record of the case in the Patent Office.

Signed and sealed this 8th day of December, A. D. 1942.

Henry Van Arsdale,
Acting Commissioner of Patents.

(Seal)